US012632592B2

(12) United States Patent
Rath et al.

(10) Patent No.: US 12,632,592 B2
(45) Date of Patent: May 19, 2026

(54) CONFIRMATION OF RETENTION LOCKED COMPLIANCE DATA PRESENCE IN A BACKUP SERVER

(71) Applicant: Dell Products L.P., Round Rock, TX (US)

(72) Inventors: Jagannathdas Rath, Bangalore (IN); Srisailendra Yallapragada, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 18/425,668

(22) Filed: Jan. 29, 2024

(65) Prior Publication Data

US 2025/0245379 A1     Jul. 31, 2025

(51) Int. Cl.
*G06F 21/62*          (2013.01)
*G06F 11/1446*        (2026.01)

(52) U.S. Cl.
CPC ...... *G06F 21/6245* (2013.01); *G06F 11/1453* (2013.01); *G06F 11/1461* (2013.01)

(58) Field of Classification Search
CPC ............. G06F 21/6245; G06F 11/1453; G06F 11/1461
See application file for complete search history.

(56) References Cited

U.S. PATENT DOCUMENTS

| | | | |
|---|---|---|---|
| 2023/0093900 A1* | 3/2023 | Scope .................. | H04L 9/0891 726/27 |
| 2024/0020202 A1* | 1/2024 | Malamut ............. | G06F 11/1461 |
| 2024/0104057 A1* | 3/2024 | Madan ................. | G06F 16/182 |
| 2024/0232399 A1* | 7/2024 | Malamut ............. | G06F 11/1451 |

* cited by examiner

*Primary Examiner* — Frantz B Jean

(74) *Attorney, Agent, or Firm* — Staniford Tomita LLP

(57)          ABSTRACT

Preventing unwanted instant data destruction of retention locked compliance data. A directory tree of the backup system is assigned a last expiry date value, which is originally initialized to zero. The last expiry date value is compared with an expiry date of a retention lock (RL) set on files in the system. If the expiry date of the RL is after the last expiry date value, the last expiry date value is updated to the expiry date so that the latest file expiry date is stored as the directory tree's last expiry date to indicate that there will be no locked files in the directory tree after the last expiry date. Upon receipt of a data destruction request the time of request is compared with the last expiry date and the request is allowed only if the current time is after the last expiry date.

19 Claims, 4 Drawing Sheets

100

200

1005

CONFIRMATION OF RETENTION LOCKED COMPLIANCE DATA PRESENCE IN A BACKUP SERVER

TECHNICAL FIELD

This invention relates generally to storing compliance data, and more particularly to providing instantly confirming the presence of compliance data in backup servers.

BACKGROUND

Long term retention of data for regulatory compliance, organizational governance needs, or any similar reason requires data to be locked for a certain duration after it is ingested/written. Retention locking is often used to store this data in an immutable, indelible form for the prescribed duration, which can be anywhere from a few days or few weeks to several years or decades. After the retention duration expires, the backup applications cleanup the backups and delete the expired files on the backup server.

Over time, backup servers can end up storing hundreds of millions to many billions of backup files due to the sheer volume of data processed in an organization (vast amounts of backup clients and backup copies) and circumstances such as delayed cleanup, preserving expired copies beyond their duration, manual backups, and so on. Retention locking of relevant data, however, is often strictly required by certain government, corporate, or regulatory requirements. In this case, deleting or cleaning such retention locked data must be cleared and performed by proper processes. Regular data deletion would involve iterating the whole filesystem and then deleting each file individually. On the contrary, the most effective and quick data deletion methods include deleting entire directory trees (MTrees) or destroying the whole filesystem, instead of the individual files. This can often include data that is under retention lock. In this case, such deletion operations should not be allowed. However, checking for the presence of such data can be a very time-consuming and expensive operation.

What is needed, therefore, is a system and method to instantly confirm the presence or absence of retention locked data in backup servers to facilitate efficient data storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Power Protect are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
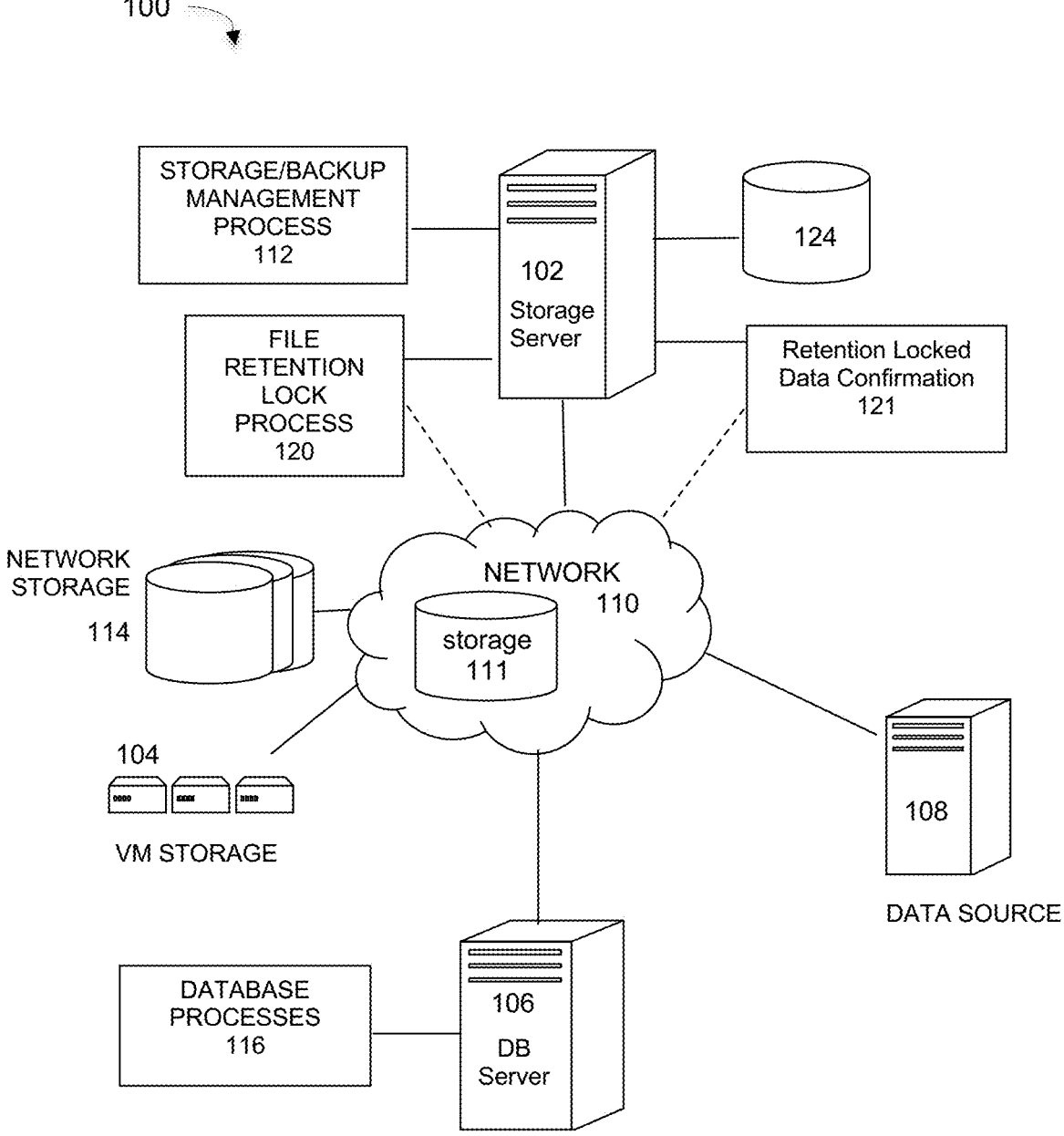
FIG. 1 is a diagram of a data protection network providing instant confirmation of the presence of retention locked data in a backup server or network storage, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method for providing instant confirmation of the presence of retention locked data in a backup server or network storage, and FIG. 1 illustrates a computer network system that implements one or more embodiments of such a system. In system 100, a storage server 102 executes a data storage or backup management process 112 that coordinates or manages the backup of data from one or more data sources 104, 106, or 108 to storage devices, such as local storage 124 in 102 itself, network storage 114, or possible cloud storage 111 in network 110. The backup server 102 hosts the backup application to manage and trigger backup jobs. These backup jobs will backup data (VMs, databases, files, etc.) from the data sources (like VMs, Databases, files etc.) to the backup/storage server.

With regard to virtual storage 104, any number of virtual machines (VMs) or groups of VMs (e.g., organized into virtual centers) may be provided to serve as backup sources. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources of data 108 for use by the resources of system 100.

The network server computers are coupled directly or indirectly to the data storage 114, VMs 104, and the data sources and other resources through network 110, which is typically a LAN, WAN or other appropriate network like a cloud network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, network 110 may be a private network or it may be a public network provided by a third-party cloud service provider (CSP).

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Power Protect Data Domain Restorer (DDR)-based deduplication storage system, and storage server 102 may be implemented as a DDR Deduplication Storage server provided by Dell Technologies, Inc. However, other similar backup and storage systems are also possible.

In an embodiment, the storage (or backup) server 102 applies one or more backup policies (e.g., conforming to application rules or governance/compliance rules) for storing the data. The deduplication backup system 112 or the storage server 102 itself, deduplicates the data according to its processes and then sends this data to storage media, also referred to as a 'storage target', which may be local storage 124, network storage 114, or any other storage of any appropriate media (e.g., disk, tape, solid state memory, etc.). For full or partial cloud-based networks, the backup data can also, or instead be sent to cloud storage 111 in network 110 after local storage in the backup system.

After the data is received in the backup system and data ingest is complete, the backup application 112 issues lock requests through process 120 to set the lock for the newly written files. Files are thus generally retention locked after they are written to the storage media or cloud storage. The retention lock can be applied to any appropriate data object or element (e.g., directory, file, filesystem, etc.) as it is written and stored in the storage media. For the embodiment of FIG. 1, the lock is applied using certain defined retention lock attributes that are associated with or encoded in the file to be retained and locked. The retention lock process may be initiated either manually or automatically.

As shown in FIG. 1, system 100 thus includes file retention lock process 120 that locks selected files against modification or deletion to protect these files from unintended or unwanted changes, or malicious tampering. In present systems, retention locking is typically enabled by user or administrator command at time of file creation or modification to allow manual locking of the file for a certain period of time, which may be extended or reverted by the user, as per allowed policies. Retention locking may also be implemented automatically by the storage server 102 as part of backup management process 112, or it may be executed by a cloud or network 110 resource, such as if a set of files is governed by a policy that automatically locks the files.

It should be noted that the data backup system of FIG. 1 is provided for purposes of illustration, and retention lock process 120 can be used with any appropriate deduplicated backup system (other than Power Protect Data Domain), and other or alternative retention policies, rules, and standards. Furthermore, although embodiments are described with relation to retention locking for certain reasons, such as regulatory compliance, embodiments are not so limited and files may be retention locked for a variety of other reasons as well.

The file retention lock process 120 may implement a manual locking process (which is typically performed explicitly by a user calling a retention lock API), or automatic retention locking (ARL), which is performed by the system automatically upon completion of data ingestion. For ARL, when the backup application issues a lock request, it will also specify attributes such as expiry date of the lock, and so on, and a default lock duration may be applied to all files.

Most backup servers 102 support proprietary client software to help in all the backup operations like optimized ingestion of data, retention locking backups, restores, and so on. For example, PowerProtect DataDomain provides DDBoost, which applications use to manage the backups completely (ingest to restore).

A popular present method of data management is for backup applications to ingest (receive as input) new backup datasets and retain them for the configured retention lock duration (e.g., 30 days), and then after that period, the backup applications clean them to free up space for new backups. In another model, backups are done manually without the presence of any backup applications. For example, program scripts performing plain copy operations on NFS or CIFS kind of mount points (exports from the backup server) and locking them manually, with deletion of these files done later manually by the administrators or automated jobs.

As stated above, backup servers over time can end up excessive amounts of data (e.g., upwards of billions of backup files. In such cases, users often seek vendor support in culling files through deletion of MTrees or the filesystem itself by using internal tools. Regular tools available to the user for file deletion may take far too long (e.g., several months) to delete all of the files that may have built up. Much of this data may include data that has been retention locked to conform with certain rules and regulations, and is thus barred from being deleted until the lock period is over.

To get around this, users requesting vendor help in large-scale data deletion may claim that retention durations have expired for all retention lock compliance data and/or there is no actively locked data present in the system. In many cases, users may not provide proof that this is the case, or they may sign a "Data Deletion Waiver" (or similar) legal document, where they acknowledge and guarantee that the MTrees or filesystem does not contain any retention lock compliance data and that all data can be validly deleted by the vendor. In such a case, the vendor must make a legal determination as to whether such data can be deleted, and customer support can then choose to fulfill or deny the user (customer) request.

This process is necessary because destructive operations like Mtree delete or Filesystem destroy are prohibited when RL-compliance mode is enabled. At present, extensive review and customer interaction is needed because current systems do not provide a quick way to check whether or not any active locked data is present in the MTree or entire filesystem.

Similarly, there is presently no way to provide guaranteed confirmation that there is no active compliance data present in the system. Customer claims are often accepted without any concrete proof of absence of such data. The only way to confirm this is by manual retention lock report/listing of all the files in the system, which is a very time and resource consuming process, especially when there are upwards of millions or billions of files present. This all leads to a situation where it is entirely possible that a vendor may end up deleting retention locked data unknowingly, un-intentionally, or accidentally.

Embodiments of system 100 provide a processing component 121 that provides efficient and instant confirmation process of the absence of any retention locked compliance data in any data element (e.g., folder, directory, filesystem, etc.) that is requested to be deleted, and to validate user claims with proof of the absence of such data so that the vendor can then perform or facilitate the data deletion. The process 121 may be executed as a server 102 based program or component, or it may be a cloud or network 110 based program.

Process 121 generally provides an efficient method to provide an instant confirmation of whether any active retention lock compliance data is present in the system or not. With this process, a user, vendor, or admin support can now validate a customer's claims of the data composition and take better decisions with respect to data deletion. This process can also be used to facilitate customers to execute the critical destructive operations themselves (like MTree delete or filesystem destroy) on retention locked compliance (RLC) systems, based on the confirmation result of this method.

Figure 2:
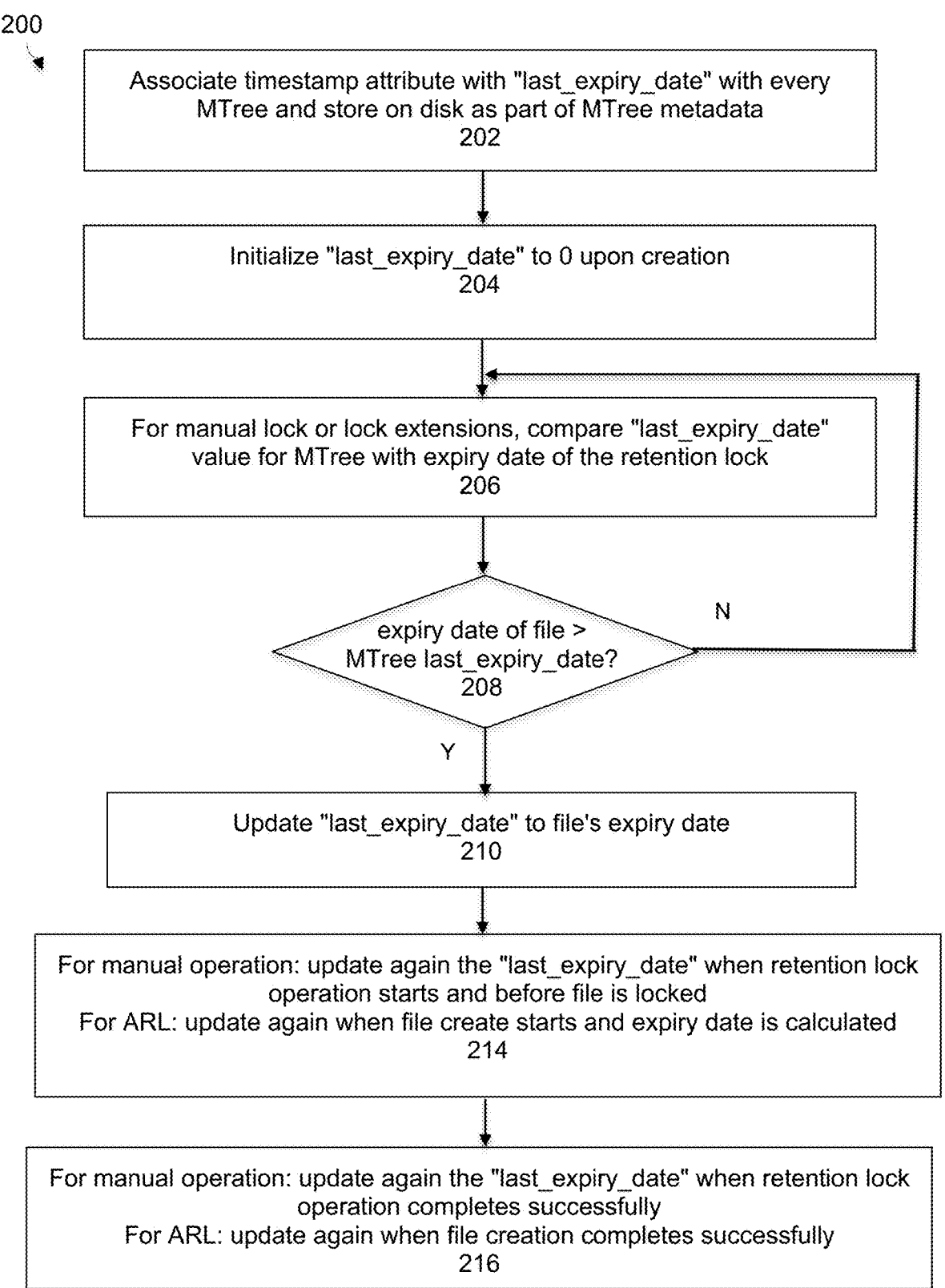
FIG. 2 is a flowchart that illustrates a method of providing confirmation of the absence of active compliance data in a system, under some embodiments.

FIG. 2 is a flowchart that illustrates a method of providing confirmation of the absence of active compliance data in a system, under some embodiments. As shown in FIG. 2, process 200 starts by associating every MTree in the backup server with a corresponding timestamp attribute, 202. The timestamp attribute includes a "last_expiry_date" entry as part of its metadata. If the backup server has any more data isolation constructs, then similar "last_expiry_date" fields need to be added as part of their metadata as well, where such constructs can include volumes, shares, cloud buckets, containers, and so on. The "last_expiry_date" values for each MTree is stored on the disk as part of the MTree metadata structure. Alternatively, all of the last_expiry_date values for all MTrees in the backup server can be collectively stored on a high-performance SSD or NVME disk location so that updates can be made much faster.

The "last_expiry_date" field is initialized to 0 when the MTree is created, 204, and is stored as a global value stored in the MTree metadata itself. This field is then updated to an actual last expiry date if appropriate, as described below. In contrast, the file's expiry date is its individual attribute and stored in its own file metadata, and indicates when the file's lock is going to expire.

Whenever a file in any MTree is manually retention locked or the lock duration is extended, process 200 compares the "last_expiry_date" value for the MTree with the expiry date of the file's lock, 206. If, as determined in block 208, the expiry_date of the file being locked is greater than (after) the last_expiry_date of MTree, the method will update the MTree's "last_expiry_date" value to match that of the file's expiry_date value, 210. In the method, when a new lock operation is triggered on a file, the process checks if the last_expiry_date of MTree is less than this new expiry date of the file, and updates the MTree's last_expiry_date with file's expiry date. The goal is to always have the last expiring file's expiry date stored in the MTree's last_expiry_date.

In the case of lock extensions, the process of FIG. 2 is altered slightly. Lock extensions extend the retention lock period from a first or old expiry date to a new expiry date. Thus, for lock duration extension operations, the method will compare the new_expiry_date of the file with the last_expiry_date of the MTree, and will similarly update the value of last_expiry_date, if its less than the new_expiry-_date.

For the case of Auto Retention Lock (ARL) enabled MTrees, when a file is created, the backup server calculates the expiry date based on the configured "default retention duration" on the Mtree. For ARL, the method will perform a similar comparison (e.g., 208) as above between the "last_expiry_date" value of the MTree and the calculated expiry_date value of the ARL file and then make the update if expiry_date value is greater than (after) the last_expiry-_date value. The "last_expiry_date" attribute for an MTree always indicates when the last file is going to expire in the MTree. Beyond that date there will be no locked files left in the MTree, only expired files or non-locked files would exist.

Occasionally, the system may experience a system crash, leaving behind a locked file beyond the last_expiry_date of the MTree (as it never got the opportunity to compare and update last_expiry_date). For example, if the last_expiry-_date is updated after the lock operation completes, then chances are that the file gets locked, but the last_expiry_date never gets updated due to a system crash. To prevent such scenarios, a comparison-based updates to the last_expiry-_date in step 210 will performed again (in a second update) in two different circumstances. First, when a retention lock operation starts and before the lock operation completes, or for ARL, when the file create starts and the expiry date is calculated, 214. Second, once the retention lock operation completes successfully (and the lock state/metadata of the file is flushed to disk), or for ARL, when the file creation completes successfully (lock state/metadata flushed to disk), 216.

In this case, the update for the last_expiry_date for that MTree will be done twice, depending on the circumstance 214 or 216. In an embodiment, the first update 210 and the second update 214 or 216 will be performed whether or not there actually is a system crash. Normally for scenarios without any crashes, the second update would be a NOP (no-operation), as expiry date will still be same for the file. For a scenario where the system crashed, restarted and then continued the data ingestion, the last_expiry_date may or may not have been successfully persisted before the crash and it will be updated correctly in this second attempt.

If a crash happens in between the two updates, i.e., after the lock operation starts or after the file is created success-fully, then at least there will not be any locked files beyond the last_expiry_date value, and in such crash scenarios, backup applications or administrators can retry the data ingest or lock operation, and once that is done, the last_ex-piry_date value will get in line. If this does not happen, the next incoming set of files will achieve this update.

As stated above, the two main operations that a user may invoke or request to delete large numbers of files comprise an MTree delete operation or a deletion of the entire filesystem.

Whenever a MTree delete operation is triggered, the method will check if the following condition is true or not:

$$current\_time > (last\_expiry\_date\ of\ MTree + buffer\_ti-me\_value)$$

The buffer_time_value is a selectable parameter that provides an additional amount of time for safety, and maybe of any appropriate duration, such as 7 days, or similar.

If the above condition is true, then it means there are no retention locked files in the system and the method will allow the Mtree delete operation to proceed. If the condition is false, then the method will reject the MTree delete operation.

To ensure that no new locked files are stored during this procedure, the MTree needs to be in offline state for such MTree deletion check operations (e.g., FIG. 2). That is, no new data should come in while this check is proceeding.

If a larger operation like "filesystem destroy" is triggered, then the method will check that the same above condition is met for all the MTrees in the system. The filesystem delete operation will be allowed to proceed only if the condition turns is determined to be true for all of the MTrees in the filesystem.

Embodiments are described with respect to large-scale data deletion operations, such as directory tree deletion or filesystem destruction, or other top level instant datastore destruction operation, but embodiments are not so limited. The same procedure can also be applied to other operations in compliance mode use, and which may be prohibited if it is not possible to conclusively confirm if there is any active locked data or not. One example operation is an MTree rename operation, or any similar directory tree or filesystem operation that changes the location, path, name, etc. of the data. Such operations may be prohibited if data is retention locked, it can change the path of locked data, thereby resulting in difficulties in accessing the data.

Figure 3:
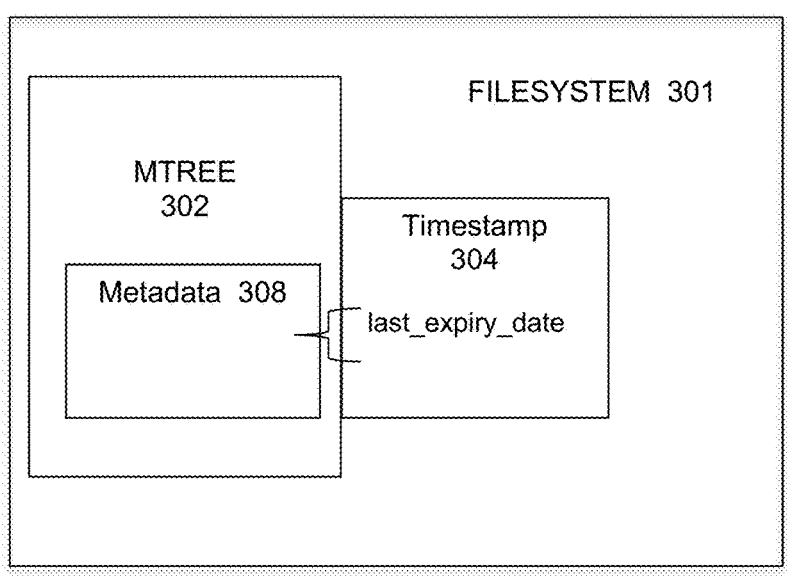
FIG. 3 illustrates the composition of MTree metadata including a last_expiry_date entry, under some embodiments.

As described above, process 200 associates every MTree in the backup server with a corresponding timestamp attri-bute that includes a "last_expiry_date" entry as part of its metadata. FIG. 3 illustrates the composition of MTree meta-data including a last_expiry_date entry, under some embodi-ments. As shown in FIG. 3, MTree 302 within a filesystem 301 includes metadata 308. A timestamp attribute 304 includes the last_expiry_date entry that is then provided as part of the metadata 308.

In an embodiment, the last_expiry_date is provided as a numeric value representing the epoch seconds of time. This is beneficial for the numerous comparisons that are per-formed during lock operations. For example, a current time in epoch of '1705436094' represents the epoch seconds, i.e., the number of seconds since Jan. 1, 1970 00:00. The last_expiry_date will contain this epoch value.

Embodiments can be used with any appropriate retention locking process. As mentioned above, the two common ways used to lock the data are thus manual locking and automatic locking. For manual locking, the lock operation is performed on the file explicitly by executing a command or calling a retention lock API provided by the backup server or cloud storage REST API. This is done either manually by the user/admin or by the backup application after the data is ingested. For example, updating the "Last access time" of a file can trigger a lock operation in some backup servers. In one example, a PowerProtect Data Domain system, the Power Protect DDBoost client software provides explicit retention lock APIs that can be triggered by any application to lock individual files. In another example, S3 REST APIs can be instructed to lock a file by adding certain HTTP Headers, e.g., in AWS S3 or Azure Blob storage, or any Public or Private cloud storage etc. Other manual retention lock mechanisms are also commonly available.

For automatic retention locking (ARL) or default locking, there is no deliberate or manual lock operation executed by users or applications (no APIs invoked to lock a file). The files are locked automatically for a predefined duration once the file or backup data is ingested by the backup server. The predefined duration is generally known as Auto Lock Period or Default Lock Period. In this mode, the backups server or cloud storage software is responsible to ensure that the dataset (file or directory, etc.) gets locked automatically.

The retention lock process may be implemented in any appropriate manner, such as explicit locking of sensitive or archived data for purposes of special or long-term storage of designated, classified, or otherwise categorized data subject to minimum storage periods and/or storage on secure media. In the case of archive data, as data ages and is seldom accessed, this data is typically moved to cheaper archive storage, where it can still be accessed, but no longer occupies valuable on-premises storage space. Such archive data is usually retrievable as individual files, email messages, or other data objects. Since archive data is the primary copy of a data file, administrators must ensure that the integrity of the data meets at least one of the two broad categories of retention standards: (1) corporate governance rules and (2) regulatory compliance (e.g. SEC 17a-4(f), CFTC, etc.) standards.

In general, the file retention lock process includes software that allows a user to set the lock on a file to prevent deletion or modification of a file for a set number of years, such as up to 70 years. The lock is set until the expiration period (expiry) during which no one is able to modify or delete the file, but after the expiration period has lapsed, the file can only be deleted and not modified. As these are compliance locked data, it is important to ensure that all locks are expired, or that this data is not present in any storage or archive that is meant to be deleted.

Figure 4:
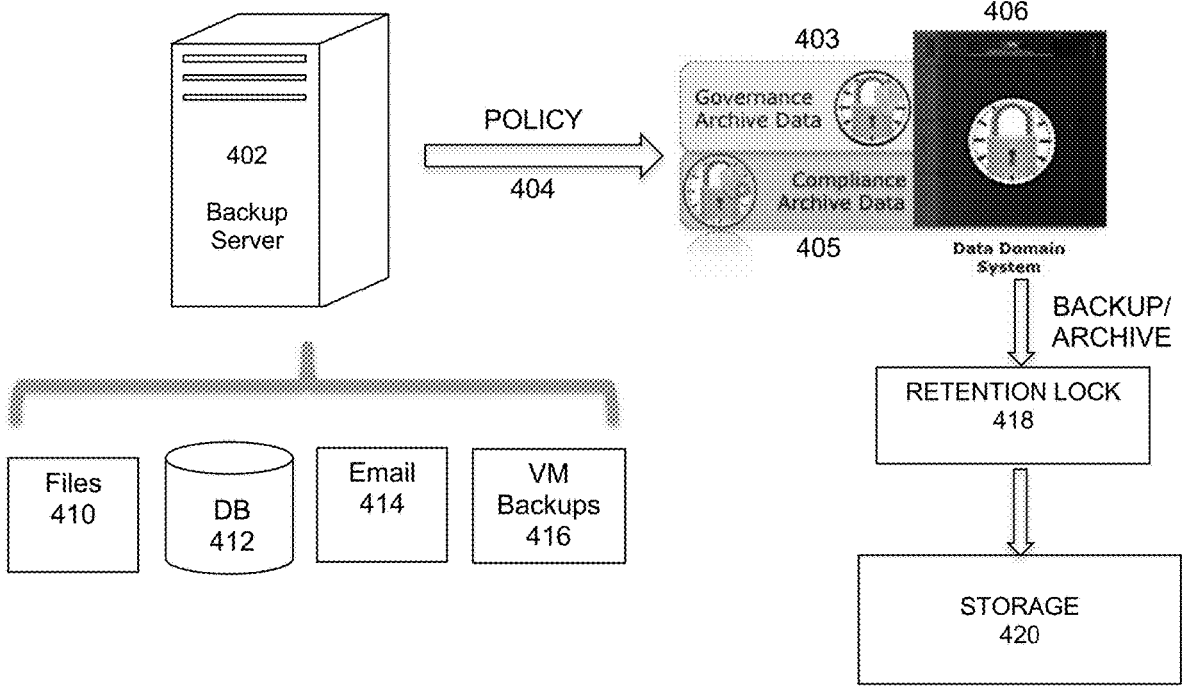
FIG. 4 illustrates a system implementing retention lock software to apply retention policies for data in a storage system, under some embodiments.

FIG. 4 illustrates a system implementing retention lock software to apply retention policies for data in a storage system, under some embodiments. As shown in FIG. 4, system 400 includes an backup server 402 that receives data from various sources, such as files 410, database data 412, email server 414, VM backups 416, and so on, for archiving through a deduplication backup system. The archive server applies one or more policies 404 conforming to standards such as governance rules 403 or compliance rules 405 for archiving or long term retention (LTR). The deduplication backup system 406 deduplicates the data according to its processes and sends this data to storage 420, which may be local, system and/or cloud storage 420. Various different storage targets are possible because data is typically locked the moment it is written locally and then moved to system or cloud storage later based on policies (e.g., move data older than 14 days old to the cloud, and so on.

For the embodiment of system 400, a retention lock process is used that can support both governance retention rules to governance archive data 402 and compliance retention rules for compliance archive data 405 in a backup system, such as a Data Domain backup system 406. This allows users to consolidate both governance and compliance archive data on a single storage system. For governance archive data 403, the corporate governance standards for secure archive data retention are generally considered to be the more lenient standards. They allow for flexible control of retention policies but not at the expense of maintaining the integrity of the data during the retention period. These standards apply to environments where the system administrator is trusted with his administrative actions.

For compliance archive data 405, the system may imposes records retention requirements stipulated by the Securities & Exchange Commission ("SEC") Rule 17a-4(f) that defines compliance standards for archive storage of records retained on electronic storage media, subject to meeting certain conditions. Specifically, the conditions and requirements that an archive storage system must meet to be SEC compliant are: (1) preserve the records exclusively in a non-rewritable, non-erasable format; (2) verify automatically the quality and accuracy of the storage media recording process; (3) serialize the original and duplicate units of storage media, and the time-date for the required retention period; (4) store separately from the original a duplicate copy of the record stored on an acceptable medium.

It should be noted that the archive system of FIG. 4 is provided for purposes of illustration, and cloud-based retention lock process 418 can be used with any appropriate deduplicated backup system (other than Data Domain), and other or alternative retention policies, rules, and standards.

For an embodiment in which the deduplication system 406 is a Data Domain system, a Data Domain Managed Tree (MTree) is used to facilitate the consolidation and protection of both governance and compliance archive data in a single storage system. MTree(s) are user-defined logical partitions of the Data Domain file system that enable granular management of a Data Domain system. In an embodiment, retention lock software 418 can be enabled at an individual MTree level. In general, once a backup file has been ingested onto a Data Domain system, it is the responsibility of the backup application to set and communicate the retention period attribute to the Data Domain system. The backup application sends the retention period attribute over standard industry protocols or via proprietary protocols like Power Protect DDBoost.

Although embodiments are illustrated and described with respect to a Power Protect Data Domain system, which is a purpose-built backup appliance providing streaming deduplication, it should be noted that embodiments are not so limited and any other deduplication backup system may be used. Similarly, a cloud tier 420 may integrate with an Dell ECS or ObjectScale (or similar) system embodied as a public cloud or hosted private cloud to provide a scalable storage architecture. The archive network 400 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

As shown in FIG. 4, the data comprising stored or archived data may be embodied as files, databases, documents (e.g., messages), backups, and so on. In a filesystem, duch data may be organized generally as files. For purposes of the present description, the term 'file' means any document or data produced by an application program and can comprise structured or unstructured data. For a deduplication backup server, a file is comprised of a number of 'objects.' An object can be on the order of several Megabytes (e.g., 4.5 MB) and is essentially a container containing a number segments (e.g., 100 to 200 KB each), which are unique elements of data. Each segment is referenced by more than one file for shared objects/segments, and the files would be locked using the retention lock software. Graphically this can be represented as: FILE—>OBJECTS—>SEGMENTS.

This method can be directly applied for cloud storage deployments like S3 or Blob storage, where objects are the unit of data. In such scenarios, the objects are retention locked for a certain duration. The earlier last_expiry_date can now be maintained at the S3 bucket/container metadata level and updated on any lock setting or lock extension operations. ARL and default locking is also supported by many cloud providers and the same method described above can be likewise applied here.

Embodiments may be used with any appropriate structure or collection of large-scale data. As described above, this structure may comprise an MTree, where system 100 is a Power Protect Data Domain deduplication backup system, and a Power Protect Data Domain Managed Tree (MTree) is a user-defined logical partition of the Power Protect Data Domain file system that enables granular management of a data in Data Domain system. In an embodiment, retention lock software 120 can be enabled at an individual MTree level. In general, once a backup file has been migrated onto a Data Domain system, it is the responsibility of the backup application to set and communicate the retention period attribute to the Data Domain system. It should be noted, however, that embodiments are not so limited and any other similar directory tree structure may be used.

Likewise, although embodiments are illustrated and described with respect to a Power Protect Data Domain system, which is a purpose-built backup appliance providing streaming deduplication, it should be noted that embodiments are not so limited and any other deduplication backup system may be used. Similarly, network 110 if cloud-based may integrate with an Dell ECS (or similar) system embodied as a public cloud or hosted private cloud to provide a scalable storage architecture. The system 100 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

Embodiments of the processes and techniques described above can be implemented on any appropriate backup system operating environment or filesystem, or network server system. Such embodiments may include other or alternative data structures or definitions as needed or appropriate.

Embodiments vastly improve upon current methods of checking for RLC data that include manual iteration of the directory trees or the filesystems to find out if there is at least one active RLC locked file (which is very resource and time consuming), managing counters that are incremented whenever a file is locked (which does not indicate how many of locked files are still active), or using a continuously running daemon to keep track of the lock state of each and every file (which is non-feasible by utilizing all resources just doing filesystem walks).

Overall, process 121 provides an instant determination of the presence or absence of retention lock data in a MTree or the filesystem as a whole, without requiring traversal of the entire filesystem. The operations like MTree delete and filesystem destruction exemplify top level instant datastore destruction operations, which may be blocked in stricter compliance scenarios can now be unblocked for customers, as it can be verified that there is no RLC data included in the deletion.

The method provides vendor support with an easy way to validate the customer's claims for absence of retention lock data in MTrees or filesystems, and works equally for manually locked files as well as ARL files. The same logic can also be applied to unblock other prohibited operations in RLC mode.

Figure 5:
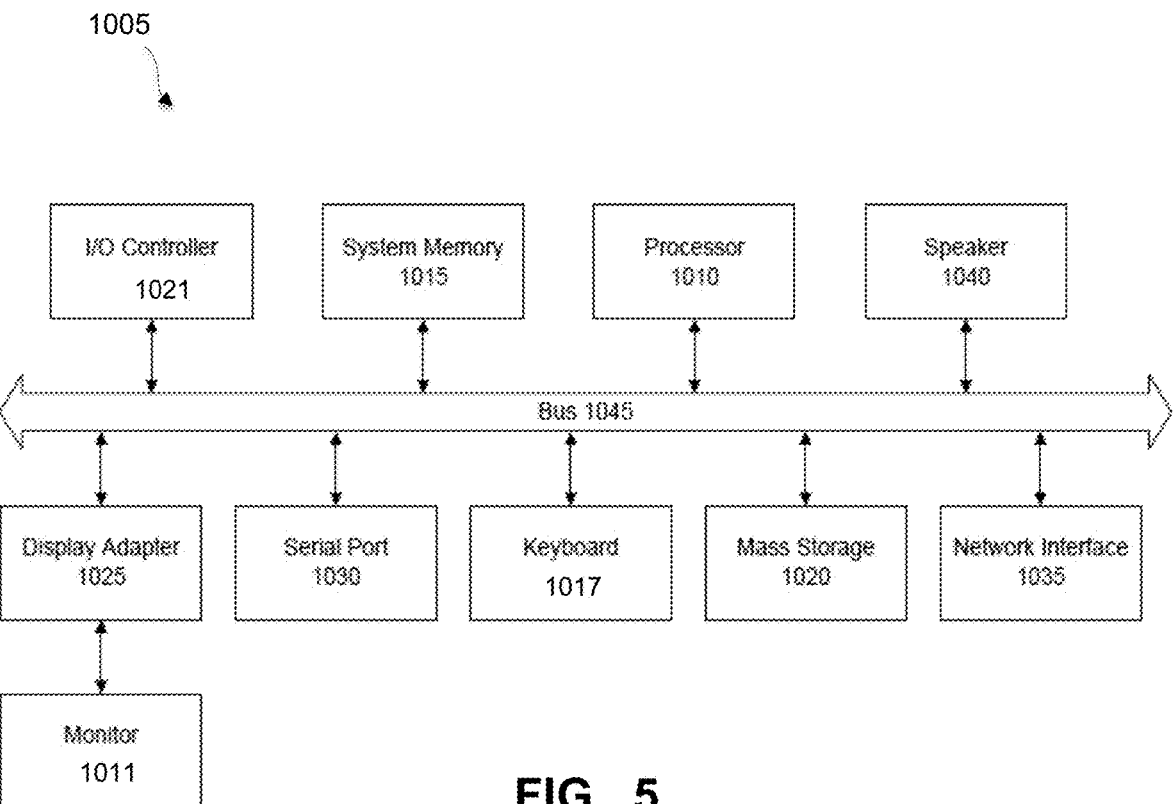
FIG. 5 is a system block diagram of a computer system used to execute one or more software components of system implementing one or more processes described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 5 shows a system block diagram of a computer system used to execute one or more software components of the present system described herein. The computer system 1005 includes a monitor 1011, keyboard 1017, and mass storage devices 1020. Computer system

1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to confirm presence of retention locked compliance data in a backup system, comprising:

associating a last expiry date value as part of a timestamp attribute with metadata of each directory tree of a filesystem of the backup system;

initializing the last expiry date value to zero upon creation of the directory tree;

first comparing the last expiry date value with an expiry date of a retention lock (RL) set on one or more files in the filesystem;

updating, if the expiry date of the RL is after the last expiry date value, the last expiry date value to the expiry date so that the latest file expiry date is stored as the directory tree's last expiry date to indicate that there will be no locked files in the directory tree after the last expiry date;

receiving a top level instant datastore destruction request;

second comparing a time of receipt of the destruction request with the last expiry date; and allowing the destruction request only if the current time is after the last expiry date and denying the destruction request if the current time is before the last expiry date.

2. The method of claim 1 wherein the retention lock is one of an initially set retention lock or an extended retention lock.

3. The method of claim 2 wherein the retention lock is applied by one of a manual process or an automatic retention lock (ARL) process.

4. The method of claim 1 wherein the destruction operation comprises at least one of a directory tree deletion request, a directory rename request, or a filesystem destruction request.

5. The method of claim 1 wherein last expiry date value comprises a numeric value representing a timestamp in epoch value.

6. The method of claim 1 further comprising adding a buffer time period to the last expiry date prior to the second comparing step, wherein the buffer time comprises an additional safety time as a selectable parameter.

7. The method of claim 3 further comprising guarding against a system crash that may result in a retention locked file stored in the directory tree after the last expiry date of the directory tree by performing an additional update of the last expiry date to update the last expiry date value to the expiry date of the resulting retention locked file.

8. The method of claim 7 wherein the additional update is performed, for a manual update, when a retention lock operation starts and before the retention lock operation completes, or for the ARL process, when the file create starts and the expiry date is calculated.

9. The method of claim 7 wherein the additional update is performed, for a manual update, after the retention lock operation completes successfully, or for the ARL process, when the file creation completes successfully.

10. The method of claim 1, wherein the backup system comprises a Power Protect Data Domain File System deduplication backup system, and wherein the directory tree comprises an MTree.

11. The method of claim 10 wherein the retention locked is locked to prevent deletion until lock expiration to conform one or more government or compliance rules and regulations.

12. A computer-implemented method to prevent unwanted deletion of retention locked compliance data in a backup system, comprising:

storing a plurality of files organized in directory tree of a filesystem in storage of the backup system;

allowing one or more files to be retention locked for a retention lock (RL) period defined by an expiry date in accordance with retention lock compliance policies;

verifying, upon receipt of an instant data destruction request, that no files with an unexpired RL period are stored in the storage as of the time of receipt, and allowing the data destruction request if so, or otherwise denying the data destruction request;

associating a last expiry date value as metadata of the directory tree;

initializing the last expiry date value to zero upon creation of the directory tree;

first comparing the last expiry date value with the expiry date of RL period of the one or more files;

updating, if the expiry date of the RL of any of the one or more files is after the last expiry date value, the last expiry date value to the expiry date so that the latest file expiry date is stored as the directory tree's last expiry date to indicate that there will be no locked files in the directory tree after the last expiry date; and second comparing a time of receipt of the instant destruction request with the last expiry date to perform the verifying step by allowing the destruction request only if the current time is after the last expiry date and denying the destruction request if the current time is before the last expiry date.

13. The method of claim 12 wherein the retention lock is one of an initially set retention lock or an extended retention lock, and further wherein the retention lock is applied by one of a manual process or an automatic retention lock (ARL) process.

14. The method of claim 13 wherein the instant destruction request is a top level directory operation comprising at least one of a directory tree deletion request, a directory rename request, or a filesystem destruction request.

15. The method of claim 13 further comprising guarding against a system crash that may result in a retention locked file stored in the directory tree after the last expiry date of the directory tree by performing an additional update of the last expiry date to update the last expiry date value to the expiry date of the resulting retention locked file.

16. The method of claim 15 wherein the additional update is performed, for a manual update, when a retention lock operation starts and before the retention lock operation completes, or for the ARL process, when the file create starts and the expiry date is calculated.

17. The method of claim 15 wherein the additional update is performed, for a manual update, after the retention lock operation completes successfully, or for the ARL process, when the file creation completes successfully.

18. The method of claim 12, wherein the backup system comprises a Power Protect Data Domain File System deduplication backup system, and wherein the directory tree comprises an MTree.

19. A system for preventing unwanted deletion of retention locked compliance data in a backup system, comprising:

a storage of the backup system storing a plurality of files organized in directory tree of a filesystem;

a retention lock (RL) component locking one or more files for a RL period defined by an expiry date in accordance with retention lock compliance policies; and a retention lock data confirmation component verifying, upon receipt of an instant data destruction request, that no files with an unexpired RL period are stored in the storage as of the time of receipt, and allowing the data destruction request if so, or otherwise denying the data destruction request by associating a last expiry date value as metadata of the directory tree, initializing the last expiry date value to zero upon creation of the directory tree, first comparing the last expiry date value with the expiry date of RL period of the one or more files, updating, if the expiry date of the RL of any of the one or more files is after the last expiry date value, the last expiry date value to the expiry date so that the latest file expiry date is stored as the directory tree's last expiry date to indicate that there will be no locked files in the directory tree after the last expiry date, and second comparing a time of receipt of the instant destruction request with the last expiry date to perform the verifying step by allowing the destruction request only if the current time is after the last expiry date and denying the destruction request if the current time is before the last expiry date.

* * * * *